United States Patent Office.

WILLIAM C. HURD, OF NEW YORK, N. Y.

Letters Patent No. 62,490, dated February 26, 1867.

---

IMPROVEMENT IN THE MANUFACTURE OF PAINTS.

---

The Schedule referred to in these Letters Patent and making part of the same.

---

TO ALL WHOM IT MAY CONCERN:

Be it known that I, WILLIAM C. HURD, of the city, county, and State of New York, have invented a new and useful Improvement in the Process of Manufacturing Paints; and I do hereby declare that the following is a full, clear, and exact description of the same.

I have heretofore obtained Letters Patent for the process of manufacturing paint by the addition of powdered quartz to oil, lead, zinc, and other materials ordinarially employed in the manufacture of paints. In this manufacture I have ascertained that in the manufacture of certain qualities of paints it is necessary that the quartz should be subjected to chemical action before being mixed, and after it is pulverized, for the purpose of removing certain impurities and fitting it for use. The quartz should first be reduced to the form of a very fine powder by being ground, and it is then purified according to circumstances, by the whole or part of the following described process; or the quartz may be subjected to the action of the solutions before being ground.

Take one hundred and sixty gallons of water, and mix therewith five pounds of sulphuric acid or its equivalent; or eight pounds of salt, or five pounds of potash, or the same quantities of both salt and potash mixed. When dissolved, stir in the pulverized quartz and agitate the same in the solution until thoroughly saturated and intermingled. Then draw off the solution, and use the purified quartz by mixing it with oil and lead or zinc, or other substances employed in making paint, according to the directions set forth in my original patent.

I do not claim either of the solutions as being new in itself, but claim the use as a part of a process new is an entirety, and which results in a superior quality of paint for certain purposes.

What I claim as my invention, and desire to secure by Letters Patent, is—

The process of manufacturing paint and colors by mingling with oil, lead, zinc, and other materials ordinarily employed in the manufacture, pulverized quartz which has first been subjected to the action of an acid, saline, or alkaline solution, or all or any of them, substantially as and for the purpose set forth.

In testimony whereof I have signed my name to this specification in the presence of two subscribing witnesses.

WILLIAM C. HURD.

Witnesses:
J. B. NONES,
JOS. A. BREWSTER.